United States Patent [19]

Genovese

[11] Patent Number: 5,071,393
[45] Date of Patent: Dec. 10, 1991

[54] CONTINUOUSLY VARIABLE TRANSMISSION

[76] Inventor: Charles J. Genovese, 32 Judith Road, Wattle Grove, Western Australia 6107, Australia

[21] Appl. No.: 603,776
[22] PCT Filed: May 31, 1989
[86] PCT No.: PCT/AU89/00241
    § 371 Date: Jan. 29, 1991
    § 102(e) Date: Jan. 29, 1991
[87] PCT Pub. No.: WO89/12185
    PCT Pub. Date: Dec. 14, 1989

[30] Foreign Application Priority Data

May 31, 1988 [AU] Australia ................... PI8523

[51] Int. Cl.⁵ .............................................. F16H 1/28
[52] U.S. Cl. .................................... 475/166; 475/170
[58] Field of Search .............. 475/166, 169, 170, 178

[56] References Cited

U.S. PATENT DOCUMENTS

| | | | |
|---|---|---|---|
| 2,035,582 | 3/1936 | Winger | 475/166 |
| 3,190,148 | 6/1965 | Flichy | 475/166 |
| 4,497,221 | 2/1985 | Koser | 475/169 X |
| 4,505,163 | 3/1985 | Falkner | 475/166 X |
| 4,920,827 | 5/1990 | Takamiya et al. | 475/170 X |
| 4,924,730 | 5/1990 | Parsons | 475/170 X |
| 5,013,288 | 5/1991 | Parsons | 475/170 X |

Primary Examiner—Dirk Wright
Attorney, Agent, or Firm—Davis Hoxie Faithfull & Hapgood

[57] ABSTRACT

A variable ratio transmission comprises a stationary housing (16) with a variable diameter internal surface (80) and an input (35, 41) and output shaft (31) journalled in the housing for rotation about a common axis co-axial with the variable diameter internal surface of the housing. A floating eccentric (43) mounted on the input shaft (35, 41) has an external cylindrical surface (44) with the eccentricity of that cylindrical surface (44) with respect to the input shaft being variable between approximate co-axiality with the input shaft to a maximum preset eccentricity. A driven member (48) supported co-axially on the floating eccentric has an external cylindrical surface (52) in rolling engagement with the internal of the variable diameter internal surface (80) and coupled to the output shaft. The rotational speed ratio between the input and output shaft is varied by varying the diameter of the internal cylindrical surface (80) of the housing and correspondingly varying the degree of eccentricity of the floating eccentric (43) to the input shaft (35, 41).

11 Claims, 4 Drawing Sheets

CONTINUOUSLY VARIABLE TRANSMISSION

The present invention relates to a transmission and particularly to a transmission which has a wide range of speed reduction and the speed is variable within that range in a continuous or non-stepwise manner.

There has previously been proposed a very wide variety of speed reduction transmissions, wherein the reduction ratio can be varied within wide limits and in a continuous manner. The majority of these prior proposed constructions are complex in construction and usually incorporate a number of gear components which are costly to manufacture and difficult to achieve low noise and vibration levels in operation.

It is the object of the present invention to provide an improved transmission which provides a continuously variable ratio within limits, is relatively cheap to manufacture, and effective and reliable in operation.

With this object in view, there is provided according to the present invention a variable ratio transmission comprising a co-axially arranged stationery housing and relatively rotatable input member, a floating eccentric mounted on the input member and having an external cylindrical surface, said floating eccentric being supported to rotate with the input member and being displaceable relative to the input member to vary the cylindrical surface between coaxiality with the input member and a maximum preset eccentricity thereto, a driven member having internal and external coaxial cylindrical surfaces and rotatably supported on the floating eccentric with the external cylindrical surface of the floating eccentric in concentric rolling engagement with the internal cylindrical surface of the driven member, said housing having a variable diameter internal cylindrical surface in rolling engagement with the external cylindrical surface of the driven member, and an output member mounted in the housing to rotate relative thereto about an axis parallel to the driven member, said output member being coupled to the driven member so that the said output member rotates in response to the planetary movement of the driven member, and means to control the diameter of said internal cylindrical surface of the housing over an operating range to vary the rotational speed ratio between the input and output members, said operational range of the diameter of the variable internal surface of the housing having a lower limit not less than substantially equal to the diameter of the external cylindrical surface of the driven member and an upper limit not more than the sum of the diameter of the external cylindrical surface of the driven member and twice the preset maximum eccentricity of the floating eccentric.

Preferably said variable diameter internal surface is defined by a plurality of elements supported in the housing for relative linear movement thereto, and spaced about the axis of input member. Conveniently the means to control the variable diameter of the internal cylindrical surface of the housing comprises at least one annular member mounted in the housing co-axial with the input member for axially movable relative to the housing. Said annular member and the elements being adapted whereby the axial movement of the annular member in one direction will effect radial movement of the elements to reduce the diameter of the variable internal cylindrical surface.

In one embodiment an output member is mounted in the housing to rotate relative thereto about an axis parallel to the input member, said output member being coupled to the driven member so that the said output member rotates in response to the planetary movement of the driven member. Conveniently the output member has a plurality of drive pins mounted thereon projecting in a direction parallel to the output member axis. The drive pin being equally spaced along a circular path co-axial with the output member axis. A plurality of apertures are provided in the driven member, equal in number to the pins and equally spaced about a circular path co-axial with the driven member axis and equal in diameter to the circular path of the pins. The apertures being of a diameter equal to the diameter of that portion of the pin located within the aperture plus the maximum eccentricity of the floating eccentric.

The transmission may include a plurality of floating eccentrics mounted on the input shaft in a side by side relation, each with a co-operating driven member in rolling engagement with the same variable diameter internal cylindrical surface of the housing. The floating eccentrics being spaced equally about the axis of the input member.

The invention will be more readily understood from the following description of one practical arrangement of the transmission as illustrated in the accompanying drawings.

Figure 1:
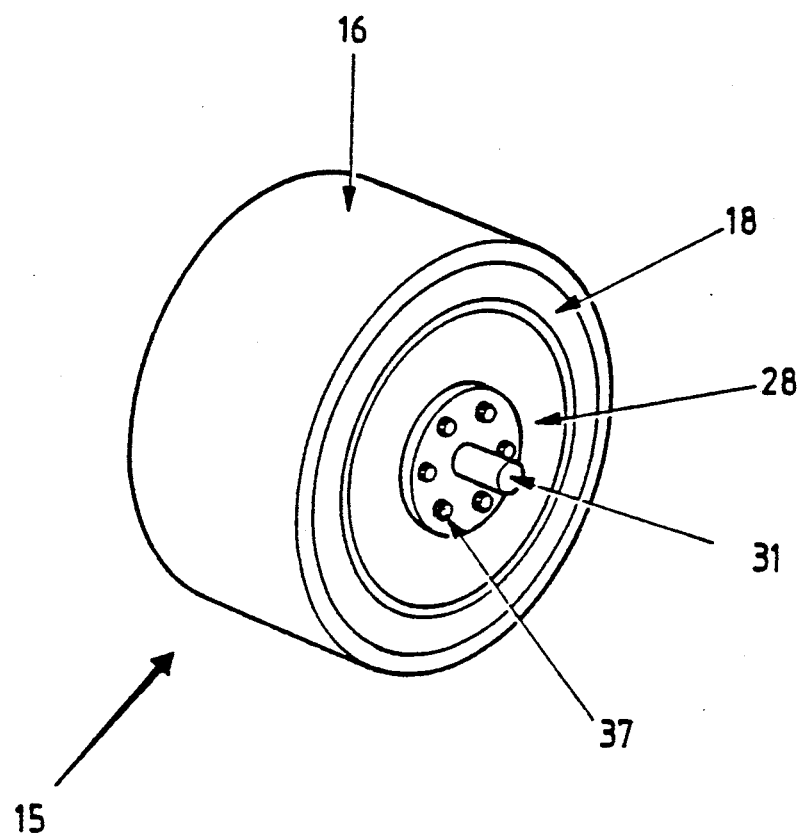
FIG. 1 is a perspective view of the complete transmission.

Referring now to FIG. 1 of the drawings, wherein there is depicted a form of the transmission having three identical sets of transmission components interconnecting input and output members and, for ease of understanding, corresponding components in each of the three sections will have the same reference numeral with the addition of the subscripts.

The basic transmission comprises an outer housing 15 comprising a peripheral wall 16 of cylindrical form and a pair of end rings 17 and 18 of the same construction, arranged in an opposing relation adjacent the respective axial ends of the peripheral wall 16. The end rings 17 and 18 are secured to the peripheral wall 16, preferably in a detachable manner, and in a sealed relationship about the periphery of the end rings. As shown, the seal may be achieved by "O" rings 19 seated in the peripheral wall 16 and engaged by the peripheral edges of the end rings 17 and 18. Sprung retaining rings 21 resiliently received in peripheral grooves 22 in the peripheral wall 16 hold the end rings 17 and 18 in the required assembly with the peripheral wall 16. Each of the end rings 17 and 18 must be secured to the peripheral wall against relative rotation so that slots formed therein, as described later, are aligned.

In use, the housing 16 remains stationary, relative to the input and output members as referred to hereinafter, and threaded apertures 25 are provided in the end ring 17, and may also be provided in the end ring 18 if desired, for securing the housing 15 to a suitable structure such as a motor housing, if the transmission is to be driven by an electric or hydraulic motor or an engine.

A pair of driven plates 27 and 28 are rotatably mounted in the respective end plates 17 and 18 for rotation relative thereto about a common axis co-axial with the housing 15. Suitable ball bearing assemblies 29 are provided to rotatably support the driven plates 27 and 28. The input shaft 35 is rotatably mounted in the bearings 34 co-axial with the driven plates 27 and 28, for free rotation relative thereto about the common axis.

Spaced symmetrically about the input shaft 35 are six drive bushes 32 rotatably supported by bearings 33 in the respective driven plates 27 and 28. A corresponding number of drive bolts 37 are provided each extending through the driven plates 27 and 28 and a respective drive bush 32. The drive bolts 37 are fixed against rotation relative to the drive plates 27 and 28, and the drive bushes mounted on the respective drive bolts can rotate relative thereto. It will be appreciated that in the above construction the driven plates 27 and 28, the six drive bushes 32 and the six drive bolts 37 all rotate in unison with respect to the housing 15.

The component to be driven may be coupled suitably to the driven plate 28 or the driven plate 27, or in fact respective components to be driven may be coupled to the driven plate 27 and driven plate 28 individually. The flanged output shaft 31 is shown secured attached to the driven plate 28 as a typical component to be coupled to the output plate 28.

The mechanism by which the motion is transmitted from the input shaft 35 to the driven plates 27 and 28 will now be described, there being illustrated in FIG. 1 of the drawings three identical mechanisms arranged side by side in the axial direction of the input shaft 35. Each mechanism being displaced through an angle of 120° from the adjoining mechanisms about the axis of the input shaft 35. The description shall specifically be in respect of the mechanism at the right in FIG. 1 and the reference numerals shall not have any subscripts. Like parts in the centre and left hand mechansim will carry the same number, but with the addition of the letters a and b respectively.

The use of a plurality of side by side mechanisms equally spaced around the axis of the input member 35 increase the torque that can be transmitted from the input member to the driven plates 27, 28 and contributes to the overall dynamic balance of the transmission.

The input shaft 35 carries an external multi-toothed splined surface 40 which extends the full distance between the respective bearings 34. Mounted on the spline 40 is a drive eccentric 41 having a cylindrical external surface 42. Mounted on the drive eccentric 41 is a floating eccentric 43 having an external cylindrical surface 44 and an internal cylindrical surface 45. The cylindrical surfaces 42 and 45 are nominally of the same diameter so that they may rotate with respect to each other.

The eccentricity of the surface 42 of the drive eccentric 41 to the input shaft 35 is equal to the eccentricity between the cylindrical surfaces 44 and 45 of the floating eccentric 43. It will thus be appreciated that by rotation of the floating eccentric 43 on the drive eccentric 41, the degree of eccentricity of the external cylindrical surface 44 of the floating eccentric with respect to the axis of the input shaft 35 can vary between zero or concentricity to a maximum of twice the eccentricity of the drive eccentric 41 to the input shaft 35.

Mounted concentrically on the floating eccentric 43 is a drive disk 48 having an inner cylindrical surface 49, co-axial with and in rolling engagement with the external surface 44 of the floating eccentric 43. Suitable ball bearings 46 are interposed between the cylindrical surfaces 44 and 49. The drive disk also has a concentric external surface 52. The drive disk 48 has a plurality of through aperture 51 formed therein equal in number, angular spacing and radial spacing to the drive bolt 37. The bushes 32 and drive bolts 37 extend through the apertures 51.

Each of the end rings 17 and 18 has an inwardly stepped circumferential portion 55 which is spaced from the outer peripheral wall 16 to provide an annular inwardly open annular recess 56, 59 at each axial end of the housing 15. The inwardly stepped portions 55 provide two inwardly directed opposing annular surfaces 57 and 58, each having a plurality of radially orientated equally peripherally spaced grooves 60. The grooves in the opposing faces 57 and 58 are aligned in the axial direction of the housing.

Supported in each pair of aligned grooves in the surfaces 57 and 58 is a segment 65 which can slide radially with respect to the axis of the input shaft 35 in the grooves 60. Each of the segments 65 has an inner face 66, which is parallel to the axis of the input shaft 35, short radial faces 67, 68 at either end, which are slidably received in the grooves 60, and a pair of equally and oppositely inclined edge faces 69 and 70 terminating in an outer flat face 71.

Figure 2:
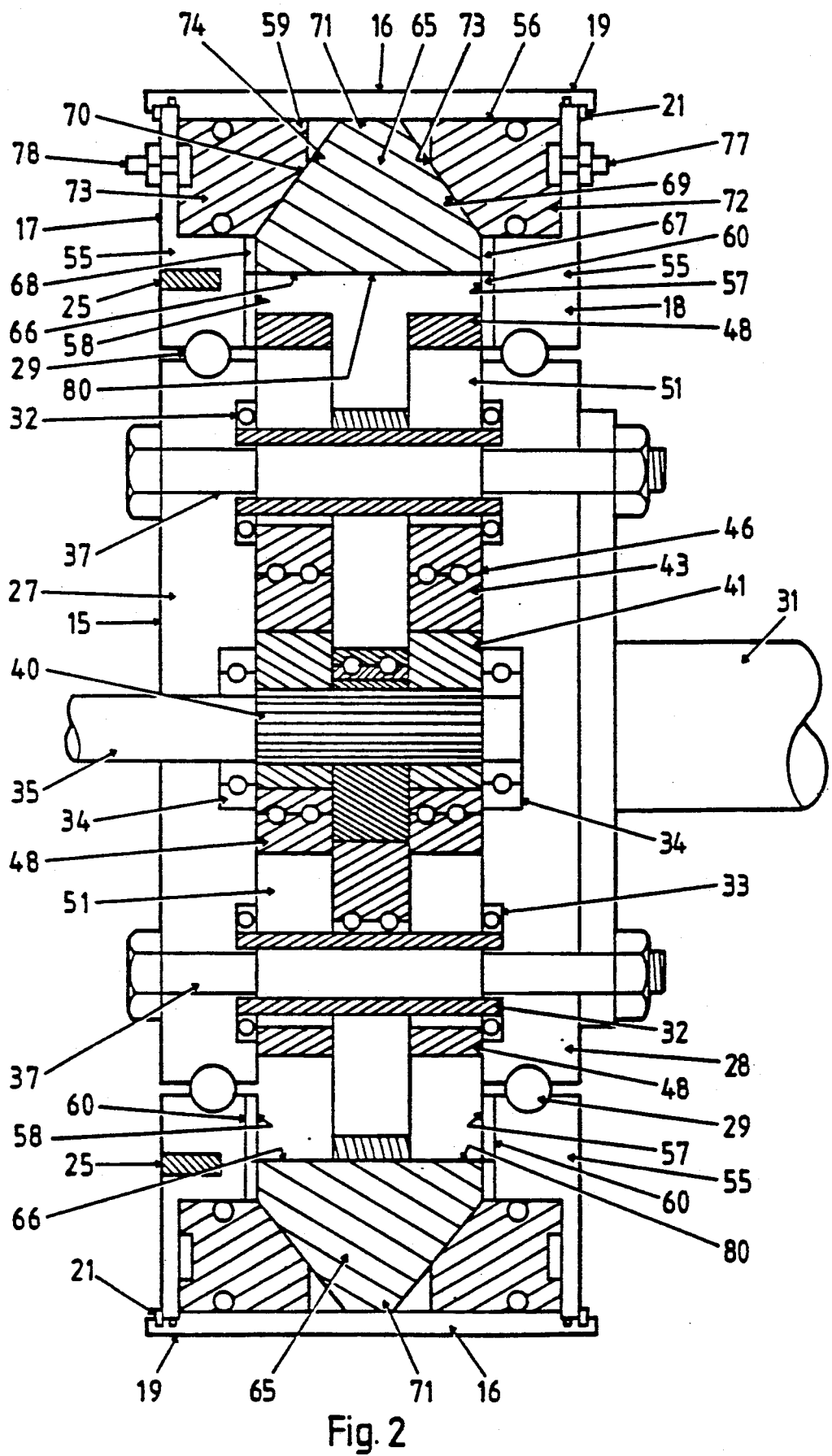
FIG. 2 is an axial cross-sectional view of the transmission shown in FIG. 1.
Figure 3:
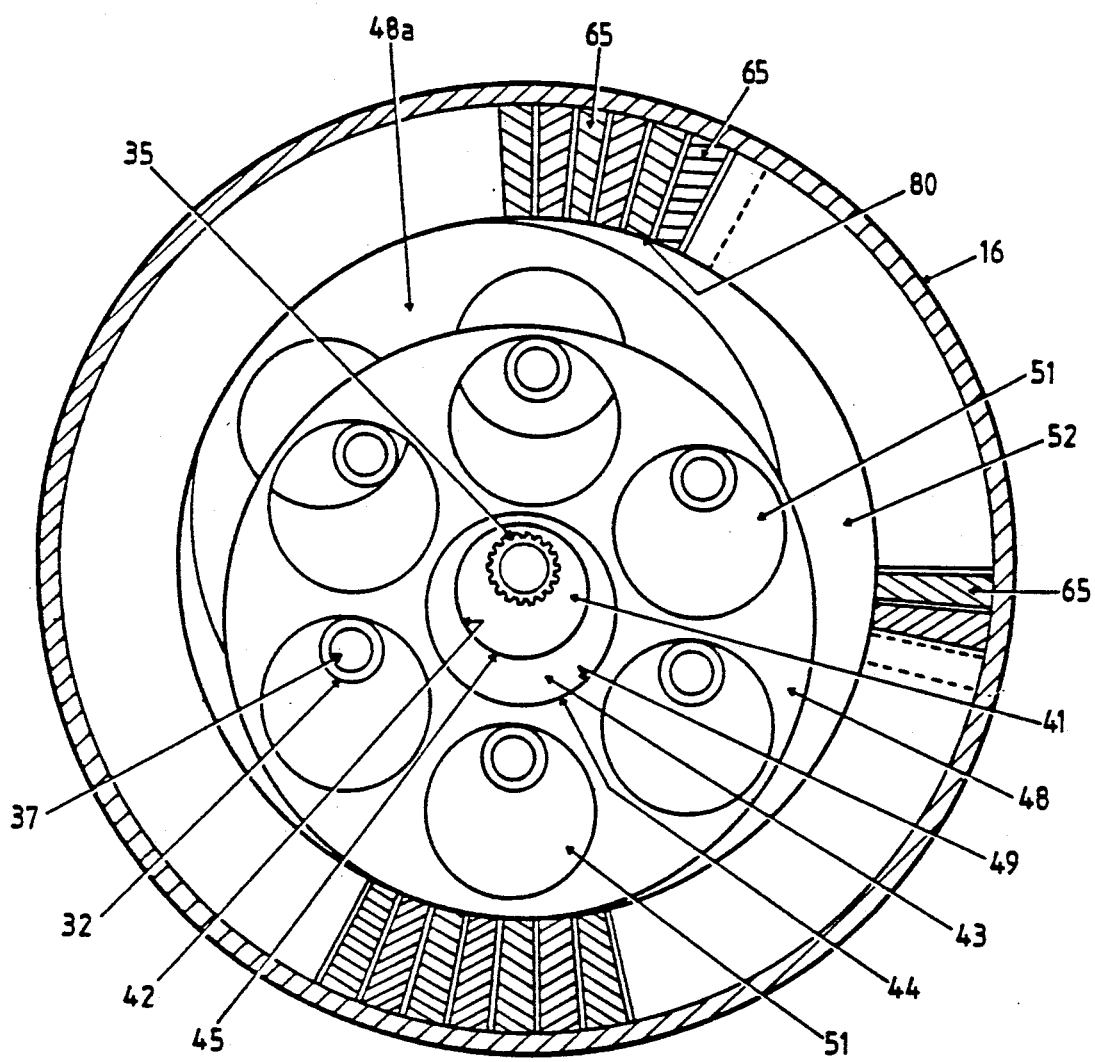
FIG. 3 is a sectional view along line 3—3 in FIG. 2.
Figure 4:
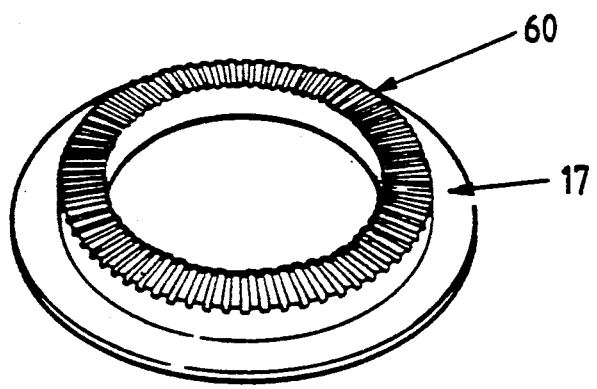
FIG. 4 is a perspective view of one end ring of the transmission.
Figure 5:
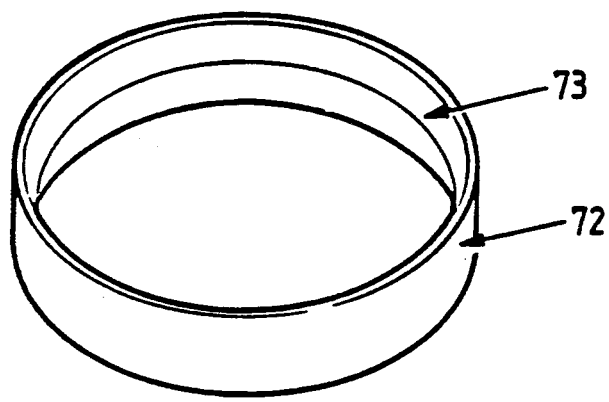
FIG. 5 is a perspective view of one of the thrust members of the transmission.

As can be seen in FIG. 2 that the plurality of inner faces of segment 65 together form an internal cylindrical surface 80 that is stationary with the housing 15 and co-axial with the input shaft 35.

Slidably supported in the respective annular recesses 56, 59 in the opposing end rings 17 and 18 are thrust cones 72 and 73, each having a respective inclined face 73 and 74 of equal inclination to the faces 69 and 70 of the segments, and in intimate contact therewith.

The manner of support and the configuration of the segments 65 and the thrust rings 72 and 73, enables the segments 65 to be moved in unison radially inwardly and outwardly with respect to the end rings 17 and 18. Movement of the thrust rings inwardly towards one another move the segments radially inwards towards the axis of the input shaft 35, and movement of the thrust rings outwardly away from one another, permits the segments 65 to move radially outward away from the axis of the input shaft 35. In this way the position of the segments may be adjusted in unison to vary the diameter of the internal cylindrical surface 80 formed by the combining of the inner surfaces 66 of the plurality of segments 65.

It will be appreciated that, as each of these segments 65 move in a radial direction with respect to the axis of the input shaft 35, the inner surfaces 66 of the segments may form a substantially continuous surface when the segments have been moved radially inward to their greatest permissible extent. As a consequence, when the segments 65 are moved outwardly to the maximum extent there will be created a small circumferential spacing between the inner surfaces 66 of adjacent segments. However, as in practice the extent of radial movement of the segments is comparatively small in relationship to the nominal diameter of the cylindrical surface 80 which they form, the spacings will not constitute a significant interruption to the continuity of the cylindrical surface 80.

Each of the thrust cones 72 and 73 have a continuous annular groove 75 and 76 in the axially outer faces thereof, which align with respective nipples 77 and 78 provided in the end rings 17 and 18 respectively. The nipples in use are coupled to a suitable hydraulic fluid circuit that operates to deliver hydraulic oil under pressure into the grooves 75, 76 to effect the inward displacement of the thrust cones 72, 73 to control the radial position of the segments 65. The hydraulic circuit can be controlled manually or automatically in accordance with the speed and/or load operating conditions of the transmission.

The varying of the effective diameter of the internal cylindrical surface 80 formed by the plurality of segments 65 varies the degree of eccentricity of the drive disc 48 with respect to the axis of the input shaft 35, this variation being achieved by rotation of the floating eccentric 43 on the drive eccentric 41. The variation in the diameter of the cylindrical surface 80 upon which the drive disc 48 rolls, and the variation in the eccentricity of the disc 48 with respect to the input shaft 45 provides the variation in the speed ratio between the input shaft and the driven plates 27 and 28. The manner of operation of the transmission will now be described in detail.

As previously explained, in use the housing 15 is fixed to a stationary object, such as an engine or motor, by way of a plurality of mounting bolts engaging the threaded apertures 25. An input torque, typically supplied by an engine or motor is applied to the input shaft 35. This causes the drive eccentric 41 to rotate with respect to the stationary housing 15. This rotation generates an unbalanced force due to the eccentricity of the drive eccentric 41, which creates a frictional contact between the external surface 42 of the drive eccentric 41 and the internal surface 45 of the floating eccentric 43, and causes the floating eccentric to rotate with the drive eccentric 41 and the input shaft 35.

The eccentric rotation of the floating eccentric 43 with the input shaft generates an unbalanced force which creates frictional contact between the external surface 44 of the floating eccentric 43, and the internal surface 49 of the drive disc 48. The unbalanced force subsequently created due to the drive disc 48 rotating eccentrically with respect to the input shaft 35 creates frictional contact between the external surface 52 of the drive disc 48 and the stationary internal surface 80 formed by the plurality of segments 65. As the housing 15, in which the segments 65 are mounted, can not rotate, then the frictional contact will cause the drive disc 48 to rotate along the internal surface 80 of the housing. The drive bushes 32 extending through the apertures 51 in the drive disc 48, will cause the driven plates 27 and 28 to rotate in the bearings 29 relative to the stationary housing 15. As the drive disc 48 is undergoing a planetary motion within the housing 15, and the drive plates 27 and 28 are undergoing pure rotation with respect to the housing 15, there will be a rolling motion of the drive bushes 32 on the internal surface of the apertures 51 in the drive disc 48. The degree of this rolling motion will vary with the degree of eccentricity of the drive disc 48 to the axis of the input shaft 35. The diameter of the apertures 51 is required to be at least, and is preferably equal to the diameter of the drive bushes 32 plus the maximum eccentricity of the floating eccentric 43 to the input shaft 35.

The overall reduction ratio between the input shaft 35 and the driven plates 27, 28 is determined by the diameter of the drive disc 48 and the difference between that diameter and the diameter of the internal surface 80 created by the plurality of segments 65, which is related to the eccentricity of the floating eccentric 43 to the input shaft 35. As the external diameter of the drive disc 48 is fixed, then the variation in the reduction ratio is controlled by varying the diameter of the internal surface 80 provided by the plurality of segments 65. In order to increase the reduction ratio, the diameter of the internal surface 80 is decreased thus reducing the difference in the diameters, and to reduce the reduction ratio the diameter of the internal surface 80 is increased. The drive disk and hence the driven plates 27 and 28 will rotate in the opposite direction to the input shaft 35.

As previously described, the segments 65 may be moved radially inward to the housing 15 so as to reduce the diameter of the internal surface 80 formed thereby by the introduction of hydraulic fluid under pressure between the thrust cones 72 and 73 and the end rings 17 and 18. In order to move the segments radially outwardly to increase the diameter, hydraulic fluid is permitted to bleed from between the thrust cones and the end ings, and the unbalanced forces created by the eccentric rotation of the drive disc 48 will force the segments to move radially outward with respect to the housing.

It will be appreciated that as the reduction ratio is being changed, there will be a degree of rotation between the floating eccentric and the drive eccentric until they have locked into a new relative relation for the selected reduction ratio. Thereafter all rotation of the input shaft is transmitted to the floating eccentric which is free to rotate on the drive disk, this rotation is assisted by the provision of the ball bearing assemblies between these respective components.

In a typical example of a transmission constructed as above described, wherein the diameter of the driven disc 48 is 200 mm and the internal diameter of the surface 80 formed by the segments 65 varies between 240 and 200 mm the minimum reduction ratio is about 5:1 and the maximum about 500:1. Theoretically the maximum reduction ratio should approach infinity as the internal surface formed by the segments approaches a diameter equal to that of the drive disc 48, however, the practical ratio is limited by the magnitude of the out of balance force and the frictional contact created thereby. It will be appreciated that as the degree of eccentricity of the drive disc 48 in relation to the input shaft 35 decreases, the out of balance forces correspondingly decrease, as also does the level of frictional content generated by the out of balance forces.

A number of variations can be made to the above described construction of the transmission, particularly in regard to the manner in which the variation in the eccentricity of the drive disc 48 to the input shaft 35 is achieved, and the manner in which the variation in the diameter of the internal surface 80 upon which the drive disc rotates is achieved and controlled.

The variable speed transmission as above described is compact, particularly in an axial direction. Further, due to the use of drive elements in the form of discs and the reliance on friction to achieve the relative motions, no gear teeth have to be cut or formed and so vibration and noise in operation is reduced.

Since the transmission is capable of a reduction ratio approaching infinity, it may be installed in a vehicle, and obviate the need for a clutch as the reduction ratio can be increased until the torque transmitted becomes zero, the engine speed being maintained relatively constant. Further the transmission may be used as an engine brake by decreasing the reduction ratio to near the limiting value and then continuing to apply pressure to the thrust cones to clamp onto the drive disc 48. Such an engine brake would supplement any noraml braking system and provide additional safety to a vehicle so fitted.

In view of the compactness and low manufacture cost, the transmission has application to electric or hydraulic driven vehicles where an individual motor and transmission is provided for each wheel.

I claim:

1. A variable ratio transmission comprising a co-axially arranged stationery housing and relatively rotatable input member, a floating eccentric mounted on the input member and having an external cylindrical surface, said floating eccentric being supported to rotate with the input member and being displaceable relative to the input member to vary the cylindrical surface between coaxiality with the input member and a maximum preset eccentricity thereto, a driven member having internal and external coaxial cylindrical surfaces and rotatably supported on the floating eccentric with the external cylindrical surface of the floating eccentric in concentric rolling engagement with the internal cylindrical surface of the driven member, said housing having a variable diameter internal cylindrical surface in rolling engagement with the external cylindrical surface of the driven member, and an output member mounted in the housing to rotate relative thereto about an axis parallel to the driven member, said output member being coupled to the driven member so that the said output member rotates in response to the planetary movement of the driven member, and means to control the diameter of said internal cylindrical surface of the housing over an operating range to vary the rotational speed ratio between the input and output members, said operational range of the diameter of the variable internal surface of the housing having a lower limit not less than substantially equal to the diameter of the external cylindrical surface of the driven member and an upper limit not more than the sum of the diameter of the external cylindrical surface of the driven member and twice the preset maximum eccentricity of the floating eccentric.

2. A transmission as claimed in claim 1, wherein a plurality of elements are supported in the housing for relative linear movement thereto, and spaced about the axis of input member to define said variable diameter internal surface.

3. A transmission as claimed in claim 2, wherein the housing includes two axially spaced end walls and each element is supported in a pair of radial slots, one in each end wall.

4. A transmission as claimed in claim 3, wherein said means to control the the variable diameter of the internal cylindrical surface of the housing comprises at least one annular member mounted in the housing co-axial with the input member for axial movement relative to the housing, said annular member and the elements being adapted whereby axial movement of the annular member in one direction will effect radial movement of the elements in a direction to reduce the diameter of said variable internal cylindrical surface.

5. A transmission as claimed in claim 4, wherein two said annular members are mounted in the housing, portion of each element projecting in the radial direction between said annular members, each element having two axially spaced inclined surfaces that converge in the radially outward direction, and each annular member having an inclined face, one complementary to each of the respective inclined surfaces of the elements whereby axial movement of the annular member towards each other effects radial movement inwardly of the element in unison to decrease the diameter of the variable internal cylindrical surface.

6. A transmission as claimed in any one of claims 1 to 5, wherein a drive eccentric is coupled to the input shaft to rotate in unison therewith, and said floating eccentric is mounted on said drive eccentric for angular movement relative thereto about an axis eccentric to the axis of the external cylindrical surface of the floating eccentric.

7. A transmission as claimed in any one of claims 1 to 6, wherein the output member has a plurality of drive pins mounted thereon projecting in a direction parallel to the output member axis, said drive pin being equally spaced along a circular path co-axial with the output member axis, a plurality of apertures in the driven member, equal in number to the pins and equally spaced about a circular path co-axial with the driven member axis and equal in diameter to the circular path of the pins, said apertures being of a diameter equal to the diameter of that portion of the pin located within the aperture plus the maximum eccentricity of the floating eccentric.

8. A transmission as claimed in claim 7, wherein two drive plates are supported for rotation in the housing and rotatably supporting the input shaft co-axial therewith, said drive plates being axially spaced with the floating eccentric and driven member disposed therebetween, said drive pins being supported by said plates to rotate therewith.

9. A transmission as claimed in claim 8 wherein the one of said plates constitutes said output member.

10. A transmission as claimed in claim 8, wherein each said plate constitutes a respective output member.

11. A transmission as claimed in any one of the preceding claims wherein there are provided a plurality of floating eccentrics mounted on the input shaft in a side by side relation, each with a co-operating driven member in rolling engagement with the same internal cylindrical surface of the housing, said floating eccentrics being spaced equally about the axis of the input member.

* * * * *